Nov. 2, 1926.

H. N. RICHARDS

TICKET CABINET

Filed Jan. 7, 1925

INVENTOR.
HERBERT N. RICHARDS
BY
ATTORNEYS.

Nov. 2, 1926.

H. N. RICHARDS

TICKET CABINET

Filed Jan. 7, 1925   2 Sheets-Sheet 2

INVENTOR.
HERBERT N. RICHARDS
BY
ATTORNEYS.

Patented Nov. 2, 1926.

1,605,145

UNITED STATES PATENT OFFICE.

HERBERT N. RICHARDS, OF TORRANCE, CALIFORNIA.

TICKET CABINET.

Application filed January 7, 1925. Serial No. 1,064.

My invention relates to cabinets for dispensing tickets, coupons and the like, and a purpose of my invention is the provision of a ticket cabinet which is extremely simple and compact in construction, occupies a minimum space, and at the same time has a large ticket capacity as to number and character to allow of the separate dispensing of the tickets of one character independently of the others.

It is also a purpose of my invention to provide a ticket cabinet having simple and durable means for controlling the manual movement of the tickets in such manner that they can be withdrawn singly and the next ticket held sufficiently secure to allow tearing off of the withdrawn ticket.

I will describe only one form of ticket cabinet embodying my invention and will then point out the novel features thereof in claims.

In the accompanying drawings:—

Figure 1:
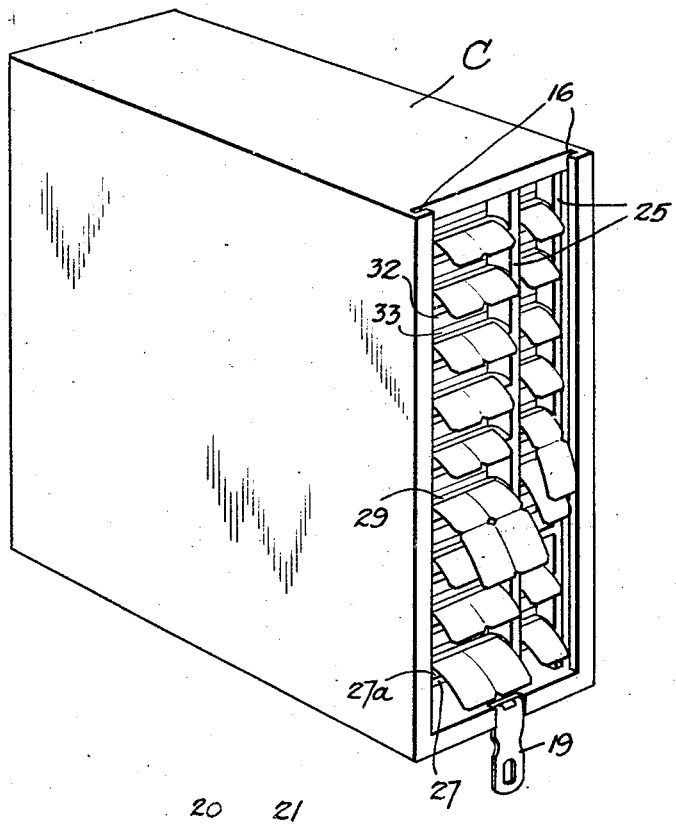
Figure 1 is a view showing in perspective one form of ticket cabinet embodying my invention, with the cover slide thereof removed.

Referring specifically to the drawings, in which similar reference characters refer to similar parts, my invention, in its present embodiment, comprises a casing C, preferably of rectangular form, and made of suitable material, such as wood, or the like, in such manner as to provide an open front side normally closed by a plate 15, preferably formed of metal and slidably received by the casing through the medium of grooves 16. The plate 15 carries a keeper 17 through which a padlock 18 is adapted to extend for securing a hasp 19 to the keeper, the hasp being hingedly supported on the bottom of the casing, as clearly illustrated.

Figure 4:
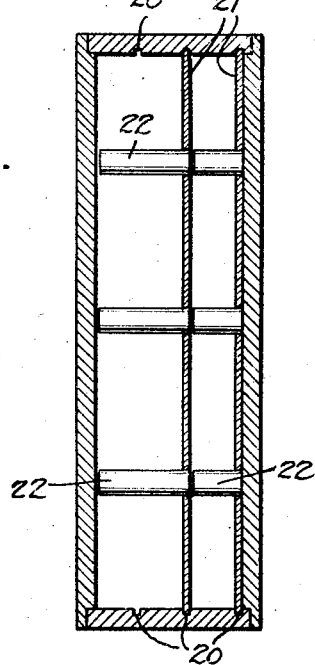
Figure 4 is a transverse vertical sectional view of the cabinet shown in Figures 1 and 2.

As illustrated to advantage in Figure 4, the bottom and top walls of the casing are provided with one or more grooves 20 adapted to slidably receive plates or partitions 21 constituting parts of ticket reel supporting units received in and completely housed by the casing. The ticket reel supporting units constitute parts of ticket supporting and dispensing units, and in the present instance I have shown the casing as accommodating two of the latter units. As the ticket supporting and dispensing units are substantially identical in construction, a description of one will suffice for both.

Each ticket supporting and dispensing unit comprises a ticket reel supporting unit which, in the present instance, is made up of one partition 21 from one side of which extends a plurality of extensions 22 which function as axles for rotatably supporting a plurality of reels 23 formed of continuous strips of tickets. In the present instance, the extensions 22 are in the form of tubes with one of their ends flared and secured within suitable openings formed in the partition 21 so as to be rigidly supported in horizontal position. By reference to Figure 2, it will be seen that the partition 21 is provided with extensions 22 arranged in a plurality of horizontal series, with the extensions of each series spaced apart sufficiently to allow independent rotation of the ticket reels thereon.

The ticket dispensing unit of each ticket supporting and dispensing unit comprises a partition 24 disposed at right angles to the partition 21, and a second partition 25 arranged to produce a continuation of the partition 21. The partitions 24 and 25 are preferably cast integral with each other, and at the junction of the two the casting is shaped to accommodate the forward vertical edge of the partition 21 as indicated at 26, and suitable fastening members, such as screws or the like, are extended through the partition 21 and into the casting for securing the partition to the casting.

Constituting a part of the casting and, therefore, formed integral with the partitions 24 and 25 are horizontal flanges 27 formed at regular spaced intervals along the length of the partitions 24 and 25 and provided with relatively sharp forward edges 27ᵃ for the purpose of facilitating the tearing of the tickets. At the junction of the flanges 27 and the partition 24, the latter is formed with slots 28, and extending into each slot is the forward free end 29 of a resilient member 30 constituting a yieldable gripping element for the tickets. Each resilient member is formed of spring metal bent to provide a J-shaped portion 30ª and an L-shaped portion 30ᵇ, a bar or strip of metal 31 being secured to the vertical part of the L-shaped portion 30ᵇ for securing the resilient member as a unit to the inner or rear side of the partition 24 and in such manner that the horizontal part of the L-shaped portion extends into the next slot 28 below the resilient member for co-operation with the free end 29 of the member to provide gripping jaws for the tickets which are adapted to be extended between the jaws.

Figure 2:
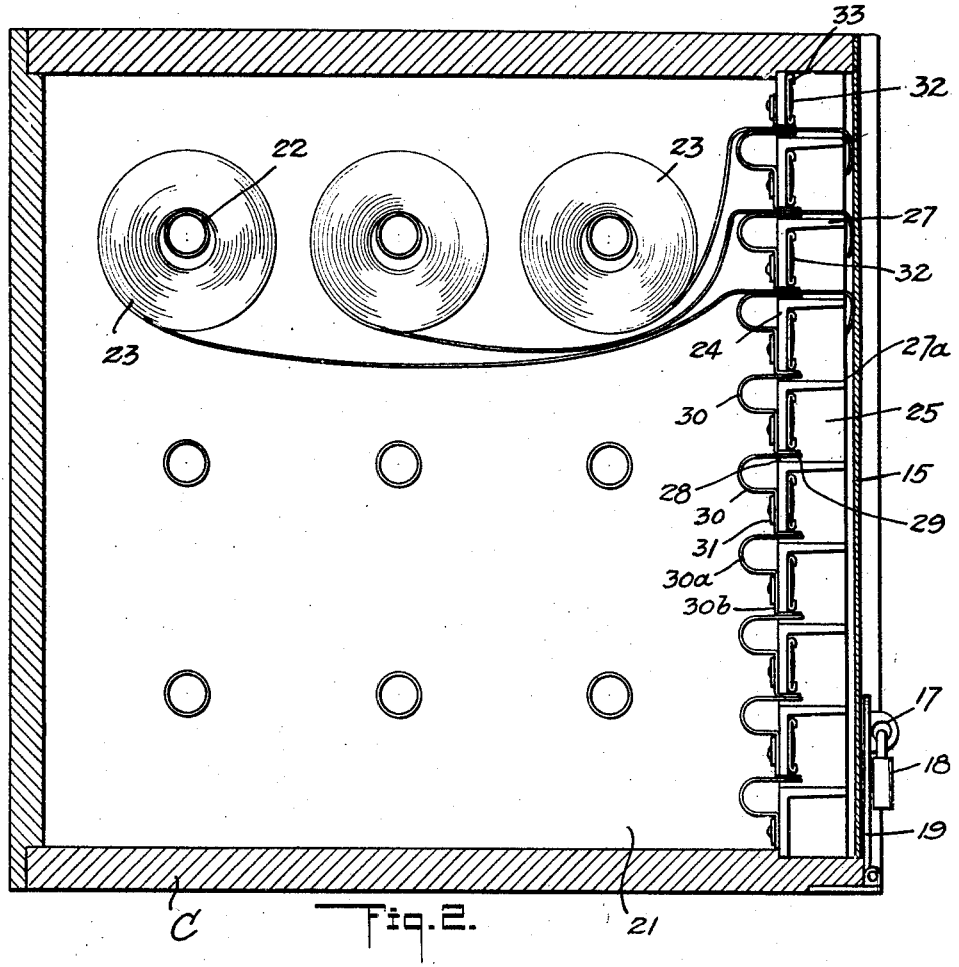
Figure 2 is a vertical longitudinal sectional view of the cabinet shown in Figure 1, with the cover slide in applied position.
Figure 3:
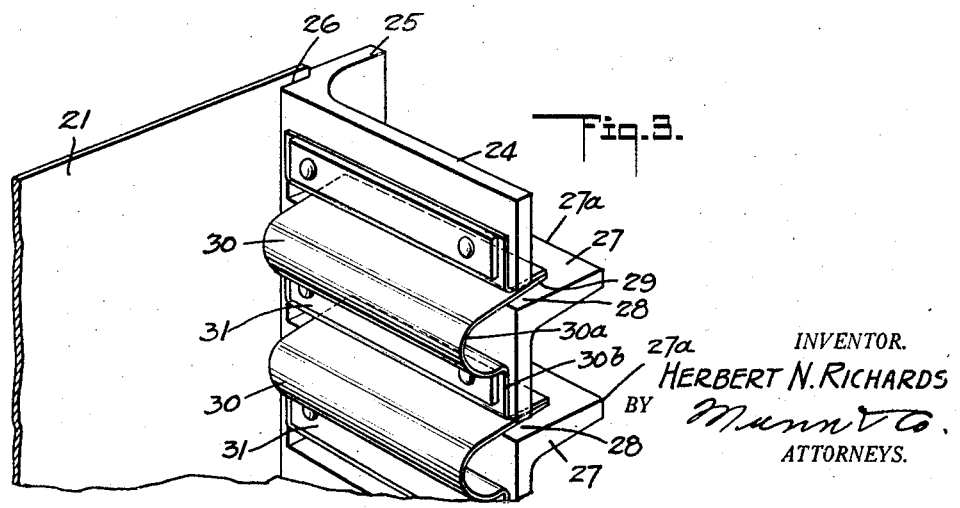
Figure 3 is an enlarged fragmentary perspective view of one of the ticket supporting and dispensing units comprised in the cabinet shown in the preceding views.

In practice, each extension 22 is adapted to support a reel of tickets 23 and the free ends of each reel are adapted to be extended through one of the slots 28 and between the corresponding portions 29 and 30ᵇ, as clearly illustrated in Figure 2, so that the attached end of the foremost ticket lies adjacent the cutting edge 27ª. With the portions or jaws 29 and 30ª gripping the tickets, it will be clear that by exerting a downward pull upon the foremost ticket, the cutting edge 27ª will operate to sever the ticket from the others for the purpose of dispensing. However, the gripping action of the jaws 29 and 30ᵇ is such as to yield when sufficient pull is exerted on the next ticket so that the ticket can be pulled outwardly for subsequent severing.

As illustrated in Figure 2, the strips of tickets are extended from the reels and through the slots 28 so that the dispensing of tickets from any one reel will not interfere with the dispensing of tickets from any of the other reels. It is to be understood that the tickets of any one reel are different in character from the tickets of the other reels. That is to say, they are different as to the printed matter thereon, which printed matter, in the present use of the invention, states the cities or towns constituting the starting point and destination of a motor bus trip. One reel of tickets is for a particular trip and the destination of such trip is given on a strip of paper 32 slidably received in a flanged metal plate 33 secured to the partition 24 at a point directly above that slot 28 through which tickets bearing the same destination extend.

From the foregoing description, taken in conjunction with the accompanying drawings, it will be manifest that I have provided a ticket cabinet in which the ticket supporting and dispensing units are extremely compactly arranged to accommodate a relatively large number of ticket reels and to allow the separate and independent dispensing of the tickets therefrom.

In the invention as illustrated, one of the ticket supporting and dispensing units is constructed to accommodate a double strip of tickets generally used for round trips, while the other unit is designed to accommodate a single strip of tickets. As shown in Figure 4, the bottom and top walls of the casing are formed at regular spaced intervals with the grooves 20, so that the casing can accommodate any desired combination of double or single ticket supporting and dispensing units, it being noted that the double strip ticket unit is twice the width of a single strip ticket unit.

Although I have herein shown and described only one form of ticket cabinet embodying my invention, it is to be understood that various changes and modifications may be made therein without departing from the spirit of the invention and the spirit and scope of the appended claims.

I claim as my invention:

1. A ticket cabinet comprising a casing, a plurality of ticket supporting and dispensing units removably received in the casing and each comprising a plate, extensions projecting from one side of the plate for rotatably supporting a plurality of ticket reels thereon, a partition secured to the plate and provided at intervals with slots, one slot for each of the ticket reels through which the tickets thereof can be extended, and yieldable gripping means extending into each two of the successive slots for releasably securing two of the corresponding strips of tickets therein.

2. A ticket cabinet comprising a casing, a plurality of ticket supporting and dispensing units removably received in the casing and each comprising a plate, extensions projecting from one side of the plate for rotatably supporting a plurality of ticket reels thereon, a partition secured to the plate and provided at intervals with slots, one slot for each of the ticket reels through which the tickets thereof can be extended, yieldable gripping elements having their opposite ends extending into two slots for releasably securing the corresponding strip of tickets therein, and flanges connected to the partition and having relatively sharp edges for severing the tickets in the manner described.

3. A ticket cabinet comprising a casing, a plurality of ticket supporting and dispensing units removably received in the casing and each comprising a plate, extensions projecting from one side of the plate for rotatably supporting a plurality of ticket reels thereon, a partition secured to the plate and provided at intervals with slots, one slot for each of the ticket reels through which the tickets thereof can be extended, resilient members secured to the partition with one member for each of the slots, each member including a J-shaped portion and an L-shaped portion, the J-shaped portion having its free end extending into the corresponding slot and the L-shaped portion having its free end extending into the next slot below for co-operation with the free end of the J-shaped portion of the next resilient member below.

4. A ticket cabinet comprising a casing, a plurality of ticket supporting and dispensing units removably received in the casing and each comprising a plate, extensions projecting from one side of the plate for rotatably supporting a plurality of ticket reels thereon, a partition secured to the plate and provided at intervals with slots, one slot for each of the ticket reels through which the tickets thereof can be extended, resilient members secured to the partition with one member for each of the slots, each member including a J-shaped portion and an L-shaped portion, the J-shaped portion having its free end extending into the corresponding slot and the L-shaped portion having its free end extending into the next slot below for co-operation with the free end of the J-shaped portion of the next resilient member below, and flanges formed at intervals on the partition to form bearing surfaces for the strips of tickets by means of which they can be manually severed.

5. A ticket cabinet comprising a casing having grooves in the walls thereof, plates slidably received in the grooves, extensions projecting from one side of each plate for rotatably supporting a plurality of ticket reels, a partition having slots therein, one slot for each of the ticket reels through which the tickets from the latter can be extended, ticket gripping means comprising elements having their opposite ends positioned within two of the slots, one side of said casing being open to allow the insertion and removal of the plates therefrom, and a closure plate slidable in the casing to close the open side of the casing.

6. A ticket cabinet comprising a casing, a plurality of ticket supporting and dispensing units removably received in the casing, a partition arranged forwardly of said casing and provided at intervals with slots, one slot for each of said ticket reels through which the tickets thereof can be extended, yieldable gripping elements having their ends extending through two of said slots and adapted for co-operation to releasably secure the corresponding tickets therein, and flanges disposed on said partition in advance of the said gripping elements and having relatively sharp edges for severing the tickets.

HERBERT N. RICHARDS.